United States Patent [19]
Gundy

[11] Patent Number: 5,580,068
[45] Date of Patent: *Dec. 3, 1996

[54] LIQUID FILLED SEAL

[75] Inventor: William P. Gundy, Milford, N.H.

[73] Assignee: NPC, Inc., Milford, N.H.

[*] Notice: The terminal 54 months of this patent has been disclaimed.

[21] Appl. No.: 559,180

[22] Filed: Jul. 27, 1990

[51] Int. Cl.$^6$ .................................................. F16J 15/10
[52] U.S. Cl. ........................ 277/207 A; 277/34; 277/34.3
[58] Field of Search ............................... 277/207 R, 226, 277/34, 34.3, DIG. 2, 207 A; 285/97, 107

[56] References Cited

U.S. PATENT DOCUMENTS

| | | | |
|---|---|---|---|
| 393,684 | 11/1888 | Berryhill | 277/226 |
| 829,546 | 8/1906 | Schou . | |
| 1,966,202 | 7/1934 | Pfefferle | 277/226 |
| 1,967,466 | 7/1934 | Damsel | 277/226 |
| 2,271,777 | 2/1942 | Nathan | 277/207 A |
| 3,007,600 | 11/1961 | Horner . | |
| 3,038,732 | 6/1962 | Scott et al. . | |
| 3,048,415 | 8/1962 | Shook | 277/207 A |
| 3,147,016 | 9/1964 | Traufler . | |
| 3,258,271 | 6/1966 | Hollingsworth . | |
| 3,339,931 | 9/1967 | Hundt et al. . | |
| 3,588,132 | 6/1971 | Edmondson | 277/207 A |
| 3,712,631 | 1/1973 | Forchini et al. | 277/226 |
| 4,159,829 | 7/1979 | Ditcher . | |
| 4,269,419 | 5/1981 | Brant | 277/34.3 |
| 4,300,775 | 11/1981 | Ringel | 277/226 |
| 4,508,355 | 4/1985 | Ditcher . | |
| 4,624,465 | 11/1986 | Rogemont | 277/34 |

FOREIGN PATENT DOCUMENTS

| | | |
|---|---|---|
| 93494 | 5/1962 | Denmark . |
| 6892 | 9/1879 | Germany . |

Primary Examiner—Allan N. Shoap
Assistant Examiner—Daniel G. DePumpo
Attorney, Agent, or Firm—Pearson & Pearson

[57] ABSTRACT

A liquid-filled seal for sewer pipes. The seal comprises a hollow trapezoidal cavity formed by spaced circumferentially extending walls and radially extending walls of elastomer or other material formed of substantially uniform thickness. Additional materials extending radially from the circumferentially extending walls form inner and outer annular sealing ribs that contact portions of adjacent pipes thereby to effect a seal between those sections. A non-compressible liquid fills the cavity thereby to promote uniform sealing pressure around the periphery of the pipes notwithstanding the relative position of the adjacent pipe sections.

7 Claims, 3 Drawing Sheets

1

LIQUID FILLED SEAL

BACKGROUND OF THE INVENTION

1. Field of the Invention

This invention generally relates to sewer pipe systems and more particularly to liquid-filled seals especially adapted for joining adjacent pipes in such sewer systems.

2. Description of Related Art

A conventional sewer system includes a network of pipes and manholes. Individual pipes in such systems typically have a spigot end and a bell or socket end. The pipes lay end-to-end with a spigot end of one pipe nested in the bell or socket end of an adjacent pipe. These joints are sealed to prevent leakage through the joint in both directions.

More specifically, such seals must prevent both the leakage of sewage from within the pipes to the surrounding ground and the leakage of ground water into the sewer system. The later sealing requirement is particularly important when sewage treatment facilities process the sewage. Sewage treatment systems must operate below a maximum design flow rate if the sewage processing is to be effective. If ground water infiltrates the system through the pipe joints, the total flow of sewage and infiltrated ground water, particularly during rainstorms, can exceed this maximum design flow rate. When this occurs, the effluent from the treatment facility will not be within acceptable standards.

The prior art uses several approaches for forming the joints between adjacent pipe sections in sewer systems. Initially the joints were packed with grout or cement. However, this approach is unsatisfactory because pipes can move, even when buried, and crack the grout thereby breaking the seal. The following patents disclose seal structures for use between the spigot and socket ends of adjacent lengths of sewer pipe:

6,892 (1879) Oesten (Germany)

93,494 (1962) Nielsen (Denmark)

3,258,271 (1966) Hollingsworth 3,339,931 (1967) Hundt

The Oesten patent discloses a seal comprising an annular, hollow, smooth walled, flexible liquid-filled conduit. personnel must bring equipment to the installation site for pumping water into the conduit.

The Nielsen patent discloses a hollow sealing member that is evacuated, forced between overlapping portions of the spigot and socket ends of a pipe and then reinflated to atmospheric pressure. This compresses the seal between the overlapping portions of the spigot and socket ends.

The Hollingsworth patent discloses a seal in the form of an annular hollow ring of elastic inflatable material with an oval cross section and parallel ribs or ridges. After the seal is located about the spigot end of a pipe and the pipe is installed the bell end of an adjacent pipe, equipment at the installation site forces a mass of filling material in liquid form, into the ring under pressure. This mass solidifies under normal conditions of use.

The Hundt patent discloses an annular, oval, hollow gasket with a wick of a tube or flat sheet of fibrous felt in the cavity. Equipment at the installation site injects a resin into the cavity under pressure. The resin forms a hardened mass around the wick.

The Oesten, Hundt and Hollingsworth patents all require the presence of equipment at the site solely for installing a seal. Although the Nielsen patent discloses a seal formed by admitting ambient air into a seal, the pressure exerted by ground water in sewer pipe applications can break such a seal.

The following patents disclose annular, hollow seals used between a pipe and a manhole wall:

4,159,829 (1979) Ditcher 4,269,419 (1981) Brant 4,508,355 (1985) Ditcher

Both Ditcher patents disclose annular gaskets that surround the surface of a pipe as it penetrates a manhole wall. portions of each seal key into the manhole wall, thus requiring either complicated on-site installation or the construction of preformed manholes at the factory. One of the Ditcher patents discloses an annular, hollow, pear-shaped head with a single continuous passage; the other Ditcher patent discloses multiple passages. These passages are air-filled and provide a pneumatic cushion for the pipe.

Brant discloses a seal for insertion between two cylindrical objects that has rectangular ridges about the exterior. A liquid pressurizes this seal.

The following patents disclose liquid-filled seals generally used for other applications:

829,546(1906) Schou 1,966,209 (1934) pfefferle 3,007,600 (1961) Horner 3,038,732 (1962) Scott 3,147,016 (1964) Traufler 4,300,775 (1981) Ringel Schou discloses an annular packing member with a square cross-sectioned ring filled with liquid. The outer sealing surfaces are smooth.

Pfefferle discloses a smooth surfaced, liquid-filled gasket. This gasket seals pipes containing fluid at a high pressure.

Horner shows a liquid-filled seal between an end plate and a chamber. The chamber contains a fluid under pressure.

Scott discloses an inflatable annular bushing that surrounds and positions a central pipe in an outer casing.

Traufler discloses a metal-clad gasket for insertion between flanges on adjacent lengths of pipe. The gasket has corrugations to improve gasket resiliency and resistance and seals against the escape of fluid at high pressure from the pipe.

Ringel discloses a gasket for insertion between a stationary member and a concentric rotating member. The gasket lies in a groove in the stationary member to be fully supported thereby and contains a liquid. This seal is designed for containing lubrication or other materials.

The foregoing patents that are directed to interconnecting adjacent sections of pipe are all characterized by requiring special installation equipment that must be brought to the site. The disclosed patents for sealing between pipes and manhole walls require similar equipment. The various liquid-filled seals are directed to applications with sealing requirements that differ from those in sewer pipe applications.

SUMMARY OF THE INVENTION

Therefore it is an object of this invention to provide an improved seal for adjacent sections of sewer pipe.

Another object of this invention is to provide an improved seal for adjacent sections of sewer pipe that is installed easily without the requirement for special tools at a site.

Yet another object of this invention is to provide a seal for adjacent sections of sewer pipe that prevents leakage through the joint in either direction.

In accordance with this invention one end of a pipe has a circumferentially extending groove that captures a portion of a liquid-filled radial seal. The seal comprises an annular body portion with an internal continuous cavity. A non-compressible liquid fills the chamber. The seal, with the liquid, lies in the groove. In cross-section the annular body portion has first and second radial walls and inner and outer circumferentially extending walls of nominally uniform thickness that form the cavity. Sealing portions at the inner and outer circumferential walls seal against the respective end sections of the pipe.

BRIEF DESCRIPTION OF THE DRAWINGS

This invention is pointed out with particularity in the appended claims. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
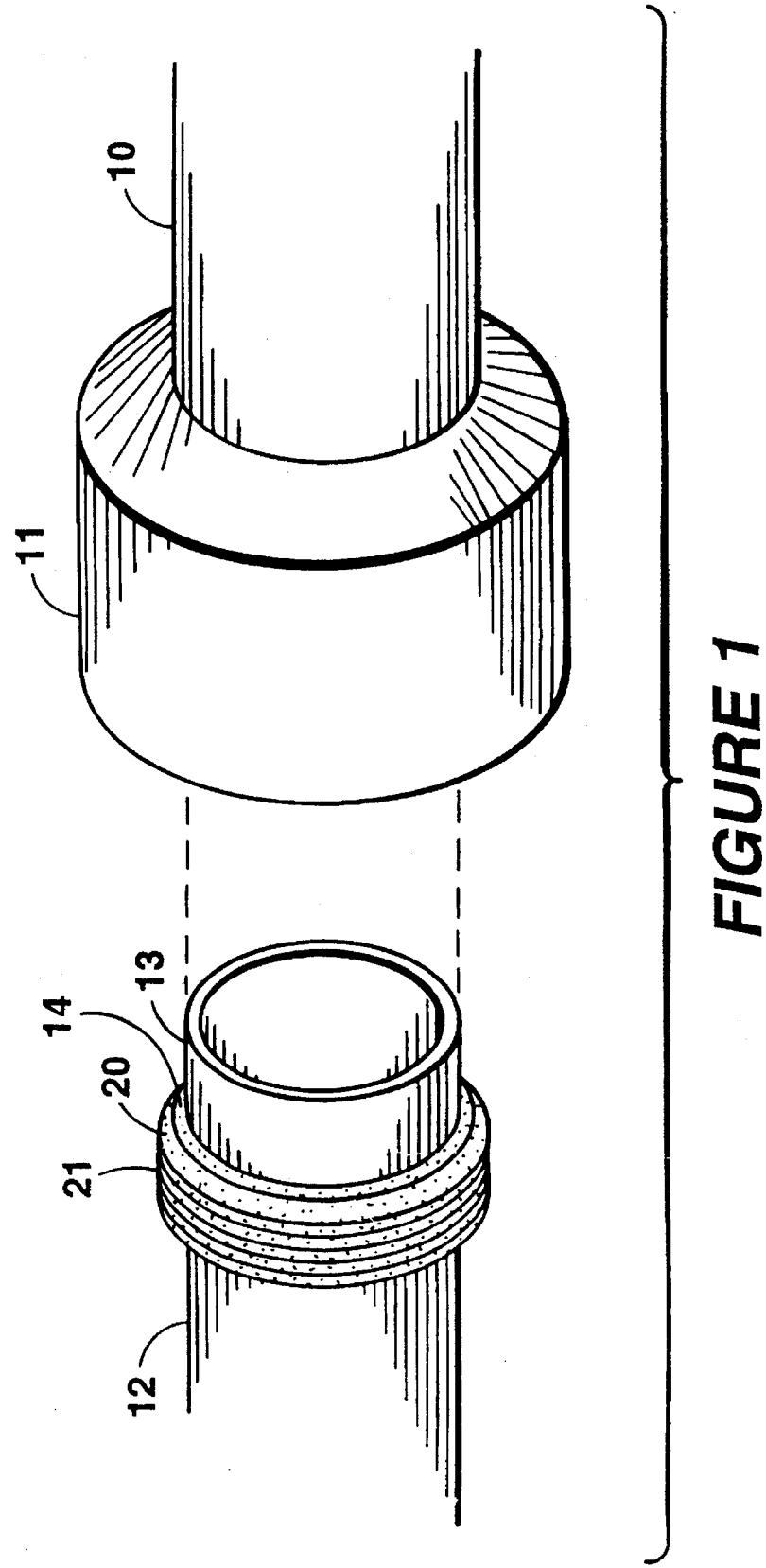
FIG. 1 is a perspective view of the opposite end sections of adjacent pipe lengths with a liquid-filled radial seal constructed in accordance with this invention.

FIG. 1 discloses a first section of pipe 10 formed of concrete or a similar material with a "bell" or "socket" end 11. In the subsequent discussion only the term "socket" is used. An adjacent second section of pipe 12 has a spigot end 13 with a rectangular circumferential groove 14 for carrying a liquid-filled radial seal 20 constructed in accordance with this invention. The diameter of the spigot end 13 is less than the inner diameter of the socket end 11. When adjacent pipes 10 and 12 are assembled, the spigot end 13, including the seal 20, nests in the spocket end 11.

Figure 2:
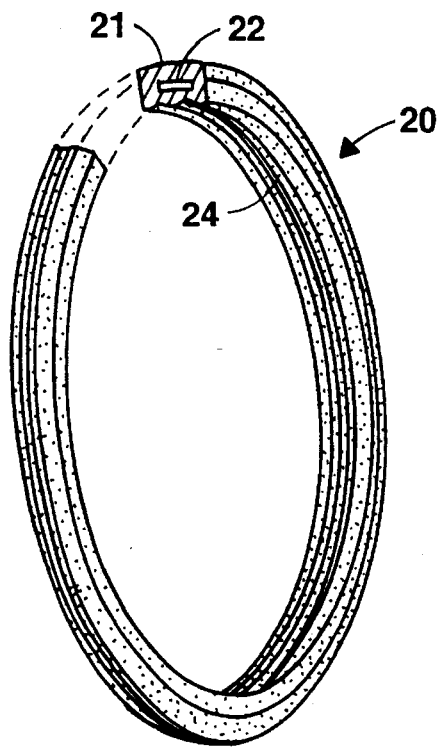
FIG. 2 is a perspective view of the liquid-filled radial seal shown in FIG. 1 with a broken section view.
Figure 3:
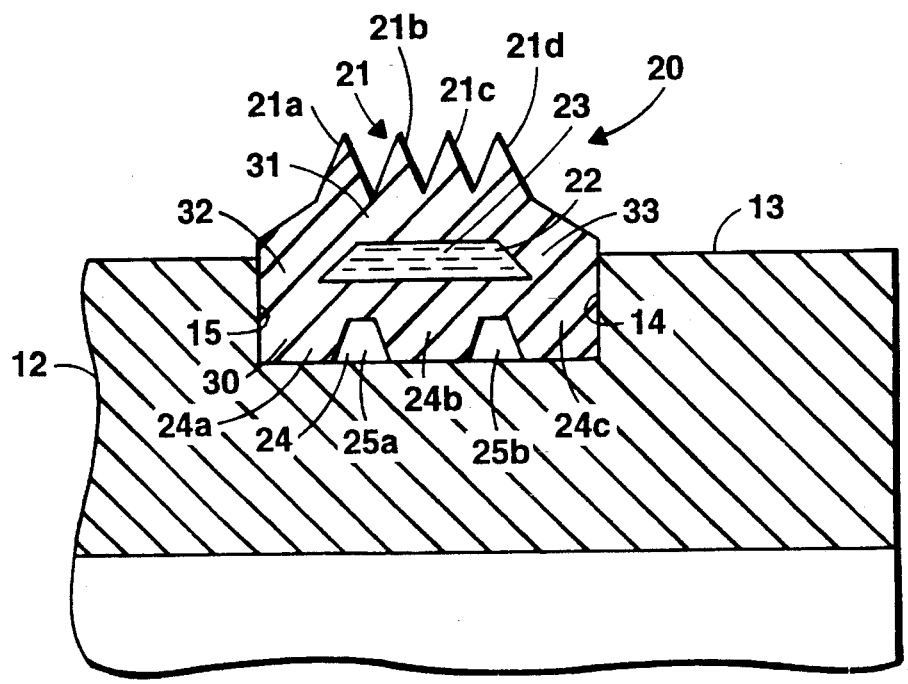
FIG. 3 is a cross-sectional view through a portion of a pipe to illustrate the relationship of the liquid-filled radial seal of FIG. 1 in a circumferentially extending groove formed in the spigot end.

As shown in FIG. 1 and more particularly in FIGS. 2 and 3, the liquid-filled seal 20 has an annular shape. It comprises an extruded elastomer or rubber material with outer vee-shaped circumferentially extending sealing ribs 21, a continuous, central trapezoidal cavity 22 that is filled with liquid 23, and interiorally facing inner sealing ribs 24.

As shown in FIG. 3, the seal 20 has an inner circumferentially extending wall 30 and a spaced, outer circumferentially extending wall 31. Radial displacement walls support the walls 30 and 31, normally on a spaced relationship. For example, radially extending walls 32 and 33 interconnect the walls 30 and 31 in FIG. 3. These walls collectively define the trapezoidal cavity 23 with base dimensions that are greater than the altitude or height of the cavity 22 and that lie along an axis of the pipe 12.

The outer circumferentially extending wall 31 has additional material on its exterior surface that forms a plurality 21 of sealing ribs, including sealing ribs 21a, 21b, 21c and 21d, and each have a triangular cross section. A plurality 24 of inner sealing ribs include inner sealing ribs 24a, 24b and 24c, which extend radially inward from the inner circumferential wall 30 and are defined in shape by two spaced truncated triangular grooves 25a and 25b.

For purposes of disclosure and by way of example, a seal constructed in accordance with FIGS. 1 through 3 and with the following dimensional relationships achieves all of the objectives of this invention:

1. The overall height of the seal is about 75% of the overall width;
2. The cavity height is about 20% of the overall height;
3. The dimension between the bases of the sealing ribs 21 and 24 is about 50–55% of the overall height;
4. The thickness of the inner wall 30 is about 14% of the overall height; the outer wall 31, about 20%; each of the walls 32 and 33, about 23%;
5. There are four triangular sealing ribs 21a, 21b, 21c and 21d with three interstices. There are three sealing ribs 24a, 24b and 24c formed by two spaced truncated triangular grooves 25a and 25b;
6. The height of sealing ribs 21 is about 20–25% of the overall height; the height of the sealing ribs 24, about 25–30%.

Sewer pipes come in standard sizes so it is feasible to produce sealing rings such as shown in FIG. 2, under factory conditions. In accordance with one embodiment, the seals 20 are extruded with the trapezoidal cavity 22 from any of several elastomeric materials or rubber. Conventional techniques butt and affix the free ends of a length of extruded material to produce an appropriately sized annular seal with a continuous cavity. Then liquid is introduced by injection to fill the cavity 22 to a predetermined pressure. The liquid can comprise any compatible non-compressible fluid such as water or a mixture of water and antifreeze solution, such as ethylene glycol.

The seal 20 therefore arrives at the installation site in a completed state. There is no need for additional equipment or materials to install it. At the installation site, personnel stretch a seal 20 over the spigot end 13 as shown in FIG. 3 and slide the seal 20 to the groove 14. Then the seal relaxes into position shown in FIG. 3.

As will be apparent from FIG. 3, the side walls 15 of the groove 14 extend only partially up the sides of the seal 20, about one-third the height in one embodiment. The primary function of the groove 14 is to position the seal 20. The radial walls 32 and 33 support the seal 20 radially independently of the groove 14 . When the spigot end 13 and the socket end 11 are coaxial, an inner surface 16, such as shown in FIG. 4, of the socket end compresses the seal 20 evenly, primarily by compressing the plurality of sealing ribs 21 and 24.

Figure 4:
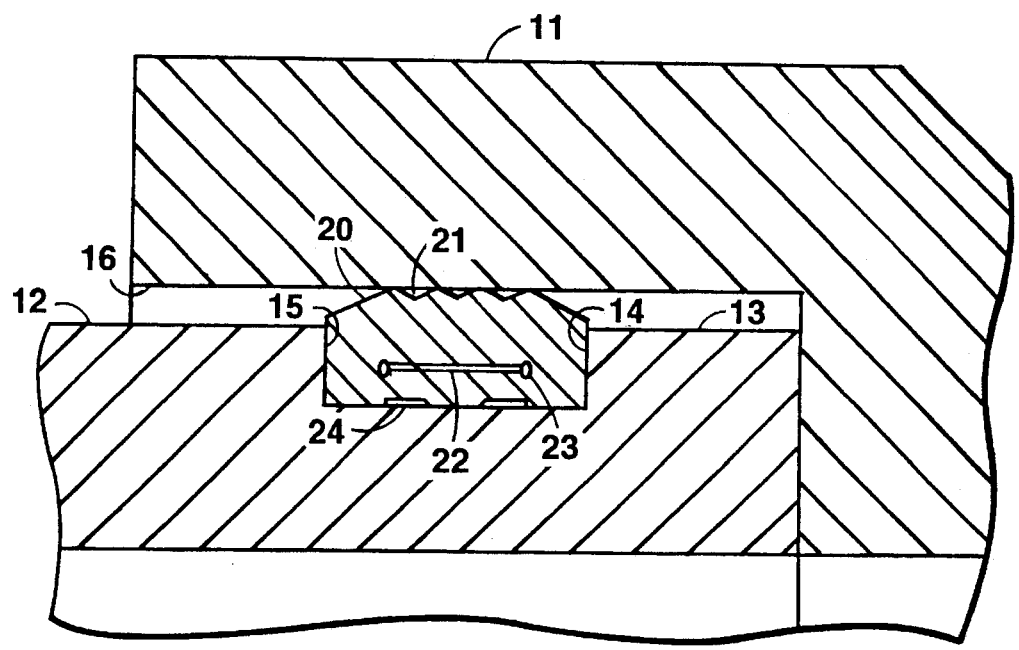
FIG. 4 is a cross-section of assembled adjacent pipes and the seal of FIG. 2 assuming that the pipes have moved to a position of maximum seal compression.
Figure 5:
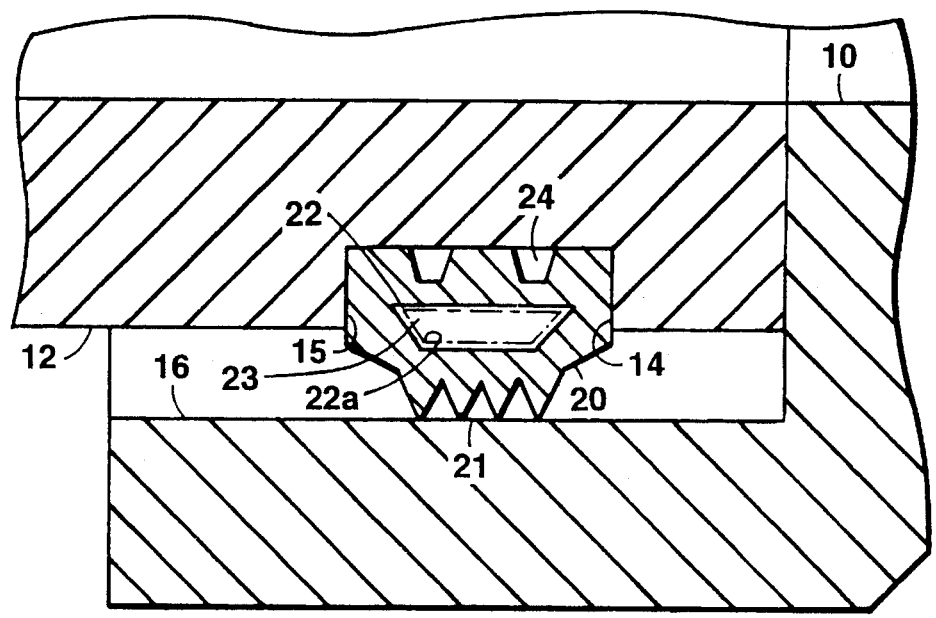
FIG. 5 is a cross-section through assembled adjacent pipes and the seal of FIG. 2 assuming that pipes have moved to a position of minimum seal compression.

If the spigot and socket ends are not coaxial the seal 20 can be placed under maximum compression conditions as illustrated in FIG. 4, minimum compression conditions as illustrated in FIG. 5 or some intermediate compression condition. In a position of maximum compression, the cavity 22 can seem to close, but the liquid 23 still can flow completely around the seal 20 within the cavity 23. With nearly complete closure of the cavity 22, the seal 20 takes on the characteristics of a solid elastomer structure and prevents further radial displacement of the spigot end 13 toward the socket end 11. Thus, adjacent pipes 10 and 12 can not touch one another, and the seal 20 maintains its integrity.

As the liquid 23 transfers from a point of maximum compression, it will expand other portions of the cavity 22. At a point of minimum compression, as shown in FIG. 5 for example, the cavity 22 is larger than the original cavity, as shown by a dashed line 22a. Thus, the radial sealing force is maintained between the sealing ribs 21 and the surface socket 16 of end 11 of the first pipe 10 and between the sealing ribs 24 and the bottom of the groove 14 in spigot end 13 of the adjacent pipe 12. Seal integrity continues even with such a shift in the relative positions of the pipes 10 and 12.

Therefore it will be apparent that a seal constructed in accordance with this invention is simple to install because it requires no special tools or handling at the site. The grooves in the spigot ends of the pipes and the liquid-filled seal are all formed under factory conditions. Once the two sections of pipe are installed, the seal 20 maintains a sealed condition by the interaction of the plurality of sealing ribs 21 and 24 with respect to the adjacent portions of the pipe 10 and 12 respectively. As the seal has thick radial side walls, it does not need to be fully supported in the radial direction. As a result the range of motion for the pipes with respect to each other is increased such that the cavity 22 can collapse before a maximum compression is reached.

The nature of the contact between sealing ribs 21 and 24 and the adjacent materials provides a seal in either direction. Ground water does not infiltrate the sewer system 20 and sewage does not leak to the exterior. Analysis of seals embodying this invention indicates unexpectedly good resistance to leakage particularly against leakage in response to ground water pressure during storms.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a pipe system having a plurality of pipes, each pipe having a spigot end and a socket end with a circumferentially extending rectangular groove of predetermined depth and diameter formed in the spigot end, and the spigot end of one pipe fitting into the socket end of an adjacent pipe length in a spaced nested relationship thereto, the improvement of a liquid-filled radial seal disposed in said groove for effecting a seal between the spigot and socket ends of adjacent pipes, said liquid-filled radial seal comprising:

a. an annular body portion having:
      i. inner and outer circumferentially extending walls and first and second radial displacement walls for supporting said inner and outer walls normally in a spaced relationship, said walls having a nominally uniform thickness for defining a continuous internal annular cavity therein,
      ii. a first sealing portion extending radially from said inner circumferentially extending wall comprising a section of material with a plurality of circumferentially extending sealing rib means formed therein for engaging the circumferentially extending surface of said groove, said first sealing portion and said inner wall having a total radial dimension that positions a portion of said radial walls and said cavity radially beyond the pipe surface at the spigot end, and
      iii. a second sealing portion extending radially from said outer circumferentially extending wall comprising a section of material with circumferentially extending, triangularly-shaped sealing ribs means engaging an inner surface of an overlying socket end of a pipe, the overall radial thickness of said inner and outer walls of said seal being greater than the predetermined depth of the groove, and
   b. a non-compressible liquid filling said internal cavity.

2. A liquid-filled radial seal as recited in claim 1 wherein said walls define a trapezoidal cavity.

3. A liquid-filled radial seal as recited in claim 1 wherein, said sealing rib means on said inner circumferentially extending wall comprises a plurality of sealing ribs formed by a plurality of annular truncated grooves in said sealing portion.

4. A liquid-filled radial seal as recited in claim 3 wherein said plurality of sealing ribs equals at least three.

5. A liquid-filled radial seal as recited in claim 1 wherein said sealing ribs means on said outer circumferentially extending wall comprises a section of material with a plurality of annularly extending, triangularly shaped sealing ribs formed therein.

6. A liquid-filled radial seal as recited in claim 5 wherein said plurality of triangularly-shaped ribs equals at least four.

7. A pipe system as recited in claim 1 wherein said liquid comprises a mixture of water and an anti-freeze liquid.

* * * * *